(12) United States Patent
Francois et al.

(10) Patent No.: US 11,305,587 B2
(45) Date of Patent: Apr. 19, 2022

(54) AGRICULTURAL VEHICLE TIRE

(71) Applicant: COMPAGNIE GENERALE DES ETABLISSEMENTS MICHELIN, Clermont-Ferrand (FR)

(72) Inventors: Eric Francois, Clermont-Ferrand (FR); Olivier Ropars, Clermont-Ferrand (FR); Florence Tran, Clermont-Ferrand (FR); Alexandra Curat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 375 days.

(21) Appl. No.: 16/622,721

(22) PCT Filed: Jun. 12, 2018

(86) PCT No.: PCT/FR2018/051375
§ 371 (c)(1),
(2) Date: Dec. 13, 2019

(87) PCT Pub. No.: WO2018/229423
PCT Pub. Date: Dec. 20, 2018

(65) Prior Publication Data
US 2021/0138838 A1    May 13, 2021

(30) Foreign Application Priority Data
Jun. 14, 2017 (FR) .................................. 17/55329

(51) Int. Cl.
*B60C 11/11* (2006.01)
*B60C 11/13* (2006.01)
*B60C 11/03* (2006.01)

(52) U.S. Cl.
CPC ....... *B60C 11/0311* (2013.01); *B60C 11/0302* (2013.01); *B60C 11/033* (2013.01); *B60C 2011/0313* (2013.01); *B60C 2200/08* (2013.01)

(58) Field of Classification Search
CPC ............ B60C 11/0311; B60C 11/0316; B60C 11/1392; B60C 11/1384; B60C 11/1307;
(Continued)

(56) References Cited

U.S. PATENT DOCUMENTS

| 4,383,567 A | * | 5/1983 | Crum | .................. B60C 11/0311 D12/544 |
| 4,534,392 A | | 8/1985 | Bonko et al. | |

(Continued)

FOREIGN PATENT DOCUMENTS

| JP | 06320915 A | * | 11/1994 | |
| JP | 09254609 A | * | 9/1997 | ......... B60C 11/0316 |

(Continued)

OTHER PUBLICATIONS

Machine Translation: JP-09254609-A, Ichikawa T, (Year: 2022).*
Machine Translation: JP-06320915-A, Ichikawa T, (Year: 2022).*
Machine Translation: JP-10338007-A, Ichikawa T, (Year: 2022).*

*Primary Examiner* — Kendra Ly
(74) *Attorney, Agent, or Firm* — Cozen O'Connor

(57) ABSTRACT

Tire tread with main lugs extending from a tread edge to the equatorial mid-plane on each side of which are a plurality of secondary lugs (4) extending over 40% to 60% of the tread half-width, each secondary lug (4) having a width 20% to 40% of the shortest distance between two main lugs (3). Each main lug (3) comprises, on its trailing lateral face (32), a widened portion (320) of width D1 extending over an axial distance from a tread edge and being joined to the main lug by end face (321) inclined at an angle B1 between 18 degrees and 25 degrees to the circumferential direction. Each secondary lug (4) has end face (43) inclined at an angle
(Continued)

S1 with the same orientation as angle B1 with respect to the circumferential direction, angle S1 being between 18 degrees and 25 degrees.

7 Claims, 2 Drawing Sheets

(58) Field of Classification Search
CPC ......... B60C 11/1315; B60C 2011/0313; B60C 2011/133; B60C 2011/1338; B60C 2200/08
See application file for complete search history.

(56) References Cited

U.S. PATENT DOCUMENTS

| | | | | |
|---|---|---|---|---|
| 4,791,971 | A * | 12/1988 | Shinn | B60C 11/0311 152/209.12 |
| 5,046,541 | A | 9/1991 | Bonko | |
| 5,411,067 | A | 5/1995 | Beeghly et al. | |
| 2013/0292019 | A1 * | 11/2013 | Vervaet | B60C 11/033 152/209.18 |
| 2014/0196823 | A1 | 7/2014 | Vervaet et al. | |
| 2016/0068025 | A1 * | 3/2016 | Kodama | B60C 11/0316 152/209.12 |
| 2016/0193882 | A1 * | 7/2016 | Mancinelli | B60C 11/1307 152/209.12 |
| 2020/0086690 | A1 * | 3/2020 | Charasson | B60C 11/0316 |

FOREIGN PATENT DOCUMENTS

| | | | |
|---|---|---|---|
| JP | 10338007 A | * | 12/1998 |
| JP | 2014 231265 | | 12/2014 |
| WO | WO 2012/093131 | | 7/2012 |
| WO | WO 2012/160060 | | 11/2012 |

* cited by examiner

AGRICULTURAL VEHICLE TIRE

RELATED APPLICATIONS

This is a U.S. National Phase Application under 35 USC 371 of International Application PCT/FR2018/051375 filed on Jun. 12, 2018.

This application claims the priority of French application no. 17/55329 filed Jun. 14, 2017, the entire content of which is hereby incorporated by reference.

FIELD OF THE INVENTION

The present invention relates to a tire intended to equip an agricultural vehicle, and more particularly a tire of which the resistance to attack caused by rolling over fields comprising a large amount of stubble is improved.

Although not limited to this type of application, the invention will be more particularly described with reference to a multipurpose agricultural vehicle, that is to say a vehicle that can be driven both in the fields on loose ground and on roads, such as an agricultural tractor.

BACKGROUND OF THE INVENTION

A tire for an agricultural vehicle is intended to run over various types of ground such as the more or less compacted soil of the fields, unmade tracks providing access to the fields, and the tarmac surfaces of roads. Bearing in mind the diversity of use, in the fields and on the road, a tire for an agricultural tractor, and in particular the tread thereof that is intended to come into contact with the ground, needs to offer a performance compromise between traction in the field, resistance to chunking, resistance to wear on the road, rolling resistance, and vibrational comfort on the road.

Definitions

An equatorial mid-plane is a plane perpendicular to the axis of rotation and passing through the points of the tire that are radially farthest from said axis. This plane divides the tire into two halves.

In the present document, a radial direction means any direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

Axially or radially outwards means a direction oriented towards the outside of the internal cavity of the tire, said cavity containing the inflation air of the tire.

The usual running conditions of the tire or use conditions are those that are defined notably by the E.T.R.T.O. standard for the European market, or the T.R.A. standard for the American market; these use conditions specify the reference inflation pressure corresponding to the load-bearing capacity of the tire as indicated by its load index and speed rating. These use conditions may also be referred to as "nominal conditions" or "working conditions".

A surface void ratio for the tread or for a region delimited on the tread is defined as the ratio between the surface area that comes into contact with a roadway and the total surface area including both the contact surface area and the surface area of the voids, this ratio being calculated either for the entire width of the tread or for a limited region of the tread.

Generally, a tire comprises a crown comprising, radially on the outside, a tread that is intended to come into contact with the ground via a tread surface, two beads that are intended to come into contact with a rim on which the tire is mounted, and two sidewalls that join the crown to the beads. A tire for an agricultural tractor comprises a carcass reinforcement, anchored in each bead, usually made up of at least one layer of textile reinforcing elements.

The carcass reinforcement is usually surmounted radially on the outside by a crown reinforcement made up of a plurality of working layers, each working layer being made up of textile or metal reinforcing elements coated in an elastomeric material. The reinforcing elements are generally crossed from one layer to the next.

The tread, which is the part of the tire that is intended to come into contact with the ground when running, comprises a bearing surface parallel or substantially parallel to the crown reinforcement of the tire. Moulded integrally on the bearing surface of the tread are main lugs, which extend from an edge of the tread to the equatorial mid-plane. These main lugs are disposed on each side of the equatorial mid-plane of the tire so as to form a V-shaped pattern, the tip of the V-shaped pattern (or chevron pattern) being intended to come into contact with the ground first. The main lugs are spaced apart from one another so as to form furrows or grooves; the width of these furrows is determined so as to allow good operation both on the road and on loose ground. The main lugs exhibit symmetry with respect to the equatorial mid-plane of the tire, usually with a circumferential offset between the two rows of lugs, similar to that obtained by one half of the tread being rotated about the axis of the tire with respect to the other half of the tread. Moreover, the lugs may be continuous or discontinuous and may be distributed circumferentially with a spacing that is constant or variable.

Each lug comprises a contact face radially on the outside and lateral faces that begin at the bearing surface of the tread. The lateral faces meet in the median part of the tread by way of at least one end face of the lug. The contact face radially on the outside is the only face intended to come into contact with a road when running on the road. When running on loose ground, the tread comes into contact with the ground at this contact face radially on the outside and also with the lateral and end faces. Depending on the nature of the ground, even the bearing surface may come into contact with the ground.

In the circumferential direction, a main lug extends over a mean width between a leading lateral face and a trailing lateral face. The leading lateral face or front face intersects the contact face radially on the outside at an edge corner, this edge corner, known as the leading edge corner, coming into contact with the ground first. The trailing lateral face or rear face intersects the contact face radially on the outside at an edge corner, this edge corner, known as the trailing edge corner, coming into contact with the ground after the leading edge corner of the same main lug.

A lug usually has a mean angle of inclination, with respect to the circumferential direction, of close to 45°. The mean angle of inclination is equal to the angle of a straight line passing through the respectively axially outer and inner end points of the mean line of the contact face, this mean line being all of the points of the contact face that are equidistant from the leading and trailing edges.

After harvesting, a large amount of stubble remains in fields, this residual stubble being able to be particularly aggressive since the ends thereof are sharp and can either attack the main lugs or come into contact with the bearing surface of the tread. In combination with the rotational movement of the tire, the digging of the stubble into the rubber can cause the material and the reinforcing elements of the reinforcements to break. This same residual stubble can also attack the lugs and cause chunking of material. All of this damage to the integrity of the tire is likely to result in complaints on the part of users and early replacement of the tire.

In the case of this known problem, various means have been proposed to reduce the consequences of such attacks, notably by modification of the geometries of the lateral faces of the lugs (see for example the document published under the number WO 2012/160060 A1).

Provision has also been made to interpose, between the main lugs, secondary lugs which are less long than the main lugs and one of the purposes of which is to protect the surface of the tread simply by being present. This is the case notably in the documents U.S. Pat. Nos. 4,383,567 and 4,534,392.

The document U.S. Pat. No. 4,383,567 describes a tread for a tire of an agricultural tractor, comprising an alternation of long main lugs and short secondary lugs. According to that document, a long main lug, the axial distance between ends of which is greater than the axial half-width of the tread, is made up of three rectilinear portions, while a short lug, the axial distance between ends of which is less than the axial half-width of the tread, is made up of two rectilinear portions.

The document U.S. Pat. No. 4,534,392 proposes a variant to the above solution, in which a combination of two successive long lugs alternates with a short lug. The advantage of such treads is that they improve the rolling comfort on the road without reducing the performance in terms of traction in the field.

While the latter solution has a certain advantage with regard to the problem encountered when rolling over stubble, there is room for improvement in this regard, and this is the object of the present invention.

Other documents, such as U.S. Pat. Nos. 5,046,541 and 5,411,067, respectively describe short lugs and long lugs that are discontinuous in order to substantially improve the problem of irregular wear that can arise with this type of construction.

SUMMARY OF THE INVENTION

One objective of the present invention is to improve the resistance of the tread and of the tire during phases of rolling over fields having a large amount of residual stubble.

This objective has been achieved according to one aspect of the invention related to a tire for an agricultural vehicle, comprising a tread of width W surmounting a crown reinforcement, the latter surmounting a carcass reinforcement. The width W of the tread is determined between axially outermost points of the external profile of the tread. When the external profile of the tread has no slope discontinuity, the axial limit is taken to be the region in which the angle of the tangent to the profile of the tread with a direction parallel to the axis of rotation is equal to 30 degrees.

An equatorial mid-plane divides the tread into two parts of equal widths.

Furthermore, the tread comprises a bearing surface on which a plurality of main lugs are moulded on each side of the equatorial mid-plane, these main lugs being oriented at a mean angle, defined as the angle of a straight line passing through the end points of a main lug, this mean angle being other than zero with the axial direction of the tire, these main lugs being disposed around the tire at a mean spacing P and extending from an edge of the tread to the equatorial mid-plane so as to form a V-shaped pattern, the tip of this V-shaped pattern being intended to come into contact with the ground first during running.

Each main lug has a contact face intersecting lateral faces, these lateral faces beginning at the bearing surface of the tread. Each main lug has a height Hp and a mean minimum width Ep defined as the mean width along the length of the main lug.

This tread also comprises, on each side of the equatorial mid-plane, a plurality of secondary lugs extending between an axial limit of the tread and a width Ls of between 40% and 60% of the half-width (W/2) of the tread, each secondary lug being interposed between two main lugs and having a width Es of between 20% and 40% of the shortest distance between two main lugs.

This tire is characterized in that:
each main lug comprises, on its trailing lateral face, defined as being the face of which the edge corner intersecting the contact face comes into contact with the ground last, a widened portion having a width D1—said widened portion with a width equal to at least 20% and at most 30% of the minimum width Ep of the main lug extending between the axially external edge of the tread and an axial distance Li at least equal to the axial length Ls of the secondary lug, this widened portion of width D1 being joined to the main lug by an end face inclined at an angle B1 at least equal to 18 degrees and at most equal to 25 degrees, this angle B1 being measured with respect to the circumferential direction, and in that:
each secondary lug comprises an end face inclined at an angle S1 with the same orientation as the angle B1 with respect to the circumferential direction, this angle S1 being at least equal to 18 degrees and at most equal to 25 degrees.

In an advantageous variant, the angle S1 of the end face of each secondary lug is at least equal to the angle B1 of the inclined end face of the widened portion of width D1.

It is specified that the main lugs extend from an edge of the tread to the equatorial mid-plane, i.e. these lugs have one end located in a region centred on this equatorial mid-plane, this region having a width equal to 5% of the width W of the tread.

Advantageously, the leading lateral face or front face of each main lug comprises, between the end close to the equatorial mid-plane and an axial width Lm at most equal to the half-width of the tread decreased by the width Ls of the secondary lugs, a widened portion of width D2 at least equal to 10% and at most 25% of the mean width Ep, this widened portion of width D2 being joined to the main lug by an end face inclined at an angle B2 of between 18 degrees and 25 degrees, this angle B2 being measured with respect to the circumferential direction and having the same orientation as the angle B1 of the widened portion of width D1 formed on the trailing face of the same main lug.

Advantageously, the surface void ratio of the central part of the tread, this central part being delimited axially by planes perpendicular to the axis of rotation and passing through the axial ends of the secondary lugs situated on either side of the equatorial mid-plane, is at least equal to 60% and at most equal to 70%. In combination with the surface void ratio of the central part that has just been defined, the surface void ratio of the edge parts of the tread that are situated axially on the outside of the central part is advantageously between 40% and 55%.

Advantageously, the difference between the surface void ratio of the central part and the surface void ratio of each edge part is at least equal to 15%.

According to a preferred embodiment of the invention, the end parts of the main lugs are joined together by a bridging portion that passes all around the tire, this bridging portion having a maximum height Hc of between 20% and 40% of the height Hp of the main lug, this bridging-portion height being measured with respect to the bearing surface of the tread, and a maximum width at most equal to the half-width of the tread decreased by the width Ls.

According to a preferred embodiment of the invention, making use of the presence of a widened portion on the leading faces of the main lugs, the ends of the main lugs are joined together by a central bridging portion extending on each side of the equatorial mid-plane. This central bridging portion extends from the bearing surface of the tread over a height Hc. It comprises, on each side with respect to the equatorial mid-plane, a lateral face oriented with the same orientation as the face joining the widened portion of width D2 to the main lug, this lateral face being inclined at an angle close or equal to the angle B2 formed by the end face of the widened portion of width D2 formed on the main lug.

Further features and advantages of the invention will become apparent from the following description given with reference to the appended drawing which shows, by way of non-limiting example, an embodiment of the subject matter of the invention.

DETAILED DESCRIPTION OF THE FIGURES

Figure 1:
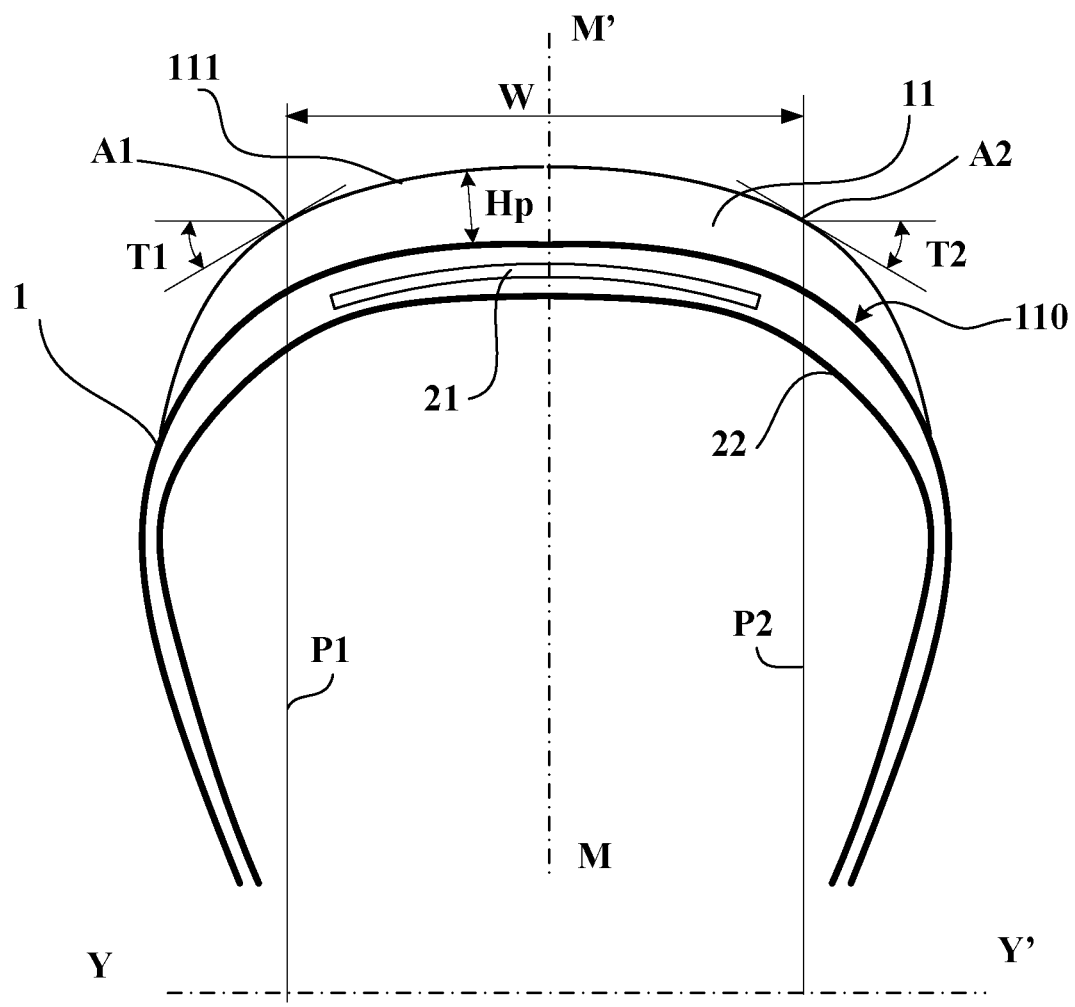
FIG. 1 shows, in a section plane passing through its axis of rotation, a tire according to one variant of the invention.

A tire 1 according to the invention is described here, this tire, of size 1000/55 R 32, being intended to equip a multipurpose agricultural vehicle. FIG. 1 shows a schematic section through this tire in a section plane containing the axis of rotation of the tire. The beads of the tire are not shown. This tire 1 comprises a tread 11 of width W equal to 1003 mm, this tread 11 surmounting a crown reinforcement 21, the latter reinforcement radially surmounting on the outside a carcass reinforcement 22.

An equatorial mid-plane divides the tread into two parts of equal widths. This plane intersects the plane of FIG. 1 along the line MM'.

Apparent in this FIG. 1 is an envelope curve of the external profile 111 of the tread; this envelope curve follows the outermost surfaces of the tread.

For this tire 1, by definition, the width W of the tread 1 is obtained as the mean axial distance between two planes P1, P2 perpendicular to the axis of rotation and passing through the points A1, A2 of the external profile 111 for which the tangents T1, T2 to the external profile 111 are inclined at an angle equal to 30 degrees with a direction parallel to the axial direction (the latter being shown by the line YY' in FIG. 1).

Figure 2:
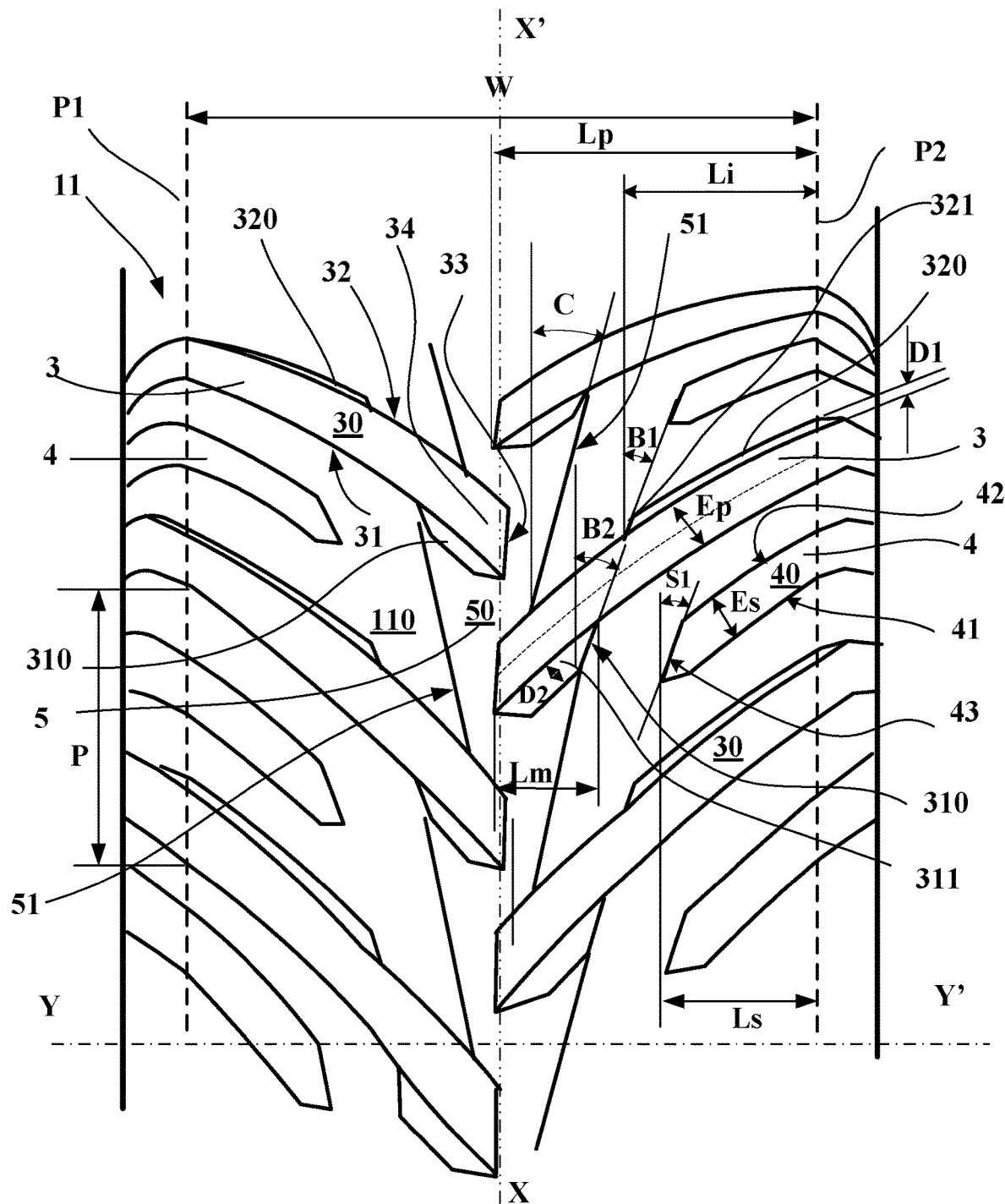
FIG. 2 shows a partial view of the tread surface of the tread of the tire shown in FIG. 1.

As can be seen in FIG. 2, which shows a partial view of the external surface of the tread of the tire shown in FIG. 1, the tread 11 comprises a bearing surface 110 on which, on each side of the equatorial mid-plane XX', a plurality of main lugs 3 are moulded, these main lugs 3 following a mean angle other than zero with the axial direction YY' of the tire. These main lugs 3 are disposed around the tire at a mean spacing P equal to 422 mm. Each main lug 3 extends from an axial limit (indicated by the lines P1, P2) of the tread to the equatorial mid-plane XX' so as to form a V-shaped pattern, the tip of this V-shaped pattern being intended to come into contact with the ground first during running.

Each main lug 3 has a contact face 30 intersecting lateral faces 31, 32, 33, these lateral faces beginning at the bearing surface 110 of the tread. Each main lug 3 has a mean minimum width Ep defined as the mean width along the length of the main lug, which is equal to 81 mm in the present case. Each main lug has a height Hp measured with respect to the bearing surface 110 equal to 40 mm.

This tread 11 also comprises, on each side of the equatorial mid-plane XX', a plurality of secondary lugs 4 extending between an axial limit of the tread and a width Ls equal to 285 mm, each secondary lug 4 interposed between two main lugs 3 having a width Es equal to 59 mm.

This tire is also such that each main lug 3 comprises, on its trailing lateral face 32 (defined as the lateral face of which the edge corner intersecting the contact face 30 comes into contact with the ground last during running), a widened portion 320 of width D1 equal to 21 mm, this widened portion 320 of width D1 extending between an axial limit of the tread and an axial distance Li measured from this axial limit which is equal to 335 mm. This widened portion 320 of width D1 is joined to the main lug 3 by an end face 321 inclined at an angle B1 equal to 21 degrees, this angle B1 being measured with respect to the circumferential direction.

Moreover, this tire 1 is such that each secondary lug 4 comprises a contact face 40 and an end face 43 forming the connection between a leading face 41 and a trailing face 42. This end face 43 is inclined here at an angle S1 with the same orientation as the angle B1 of the end face 321 of the widened portion 320; this angle S1 is equal to 21 degrees with respect to the circumferential direction.

In the example described, the surface void ratio of the central part of the tread delimited axially by two planes perpendicular to the axis of rotation and passing through the axial ends of the secondary lugs situated on either side of the equatorial mid-plane is equal to 66%. In combination, the surface void ratio of the edges of the tread, that is to say of the parts of the tread that are delimited by an axial limit of the tread (either P1 or P2) and extend over a width equal to the width Ls of the secondary lugs 4, is equal to 50%.

In the variant described, the end parts 34 of the main lugs 3 are joined together by a material bridging portion 5 that passes all around the tire, this bridging portion 5 having a mean height equal to 13 mm, this height being measured with respect to the bearing surface 110 of the tread and a maximum width equal to the width Lm. This bridging portion 5 comprises a contact face 50 intended to come into contact after the tread has been partially worn away, and a lateral face 51 oriented at an angle C equal to the angle B2 formed by the joining face 310 of the widened portion 311 of width D2 formed on the leading face 31 of the main lug 3.

The invention is not intended to be limited to this one described exemplary embodiment and various modifications can be made thereto while remaining within the scope as defined in the claims.

The invention claimed is:

1. A tire for an agricultural vehicle, comprising a tread of width W surmounting a crown reinforcement, the latter surmounting a carcass reinforcement, an equatorial mid-plane dividing the tread into two parts of equal widths, this tread comprising a bearing surface on which a plurality of main lugs are moulded on each side of the equatorial mid-plane, these main lugs being oriented at a mean angle, these main lugs being disposed around the tire at a mean spacing and extending from an edge of the tread to the equatorial mid-plane so as to form a V-shaped pattern, the tip of this V-shaped pattern being adapted to come into contact with the ground first during running, each main lug having a contact face intersecting lateral faces, these lateral faces beginning at the bearing surface of the tread, each main lug having a height Hp and a mean minimum width Ep defined as the mean width along the length of the main lug, this tread also comprising, on each side of the equatorial mid-plane, a plurality of secondary lugs extending between an axial limit of the tread and a width of between 40% and 60% of the half-width of the tread, each said secondary lug being interposed between two said main lugs and having a width Es of between 20% and 40% of the shortest distance between two said main lugs, wherein each said main lug comprises, on its trailing lateral face, defined as being the face of which the edge corner intersecting the contact face comes into contact with the ground last, a widened portion having a width D1 at least equal to 20% and at most equal to 30% of the minimum width Ep of the main lug, this widened portion of width D1 extending over an axial distance Li from an external axial limit of the tread, this axial distance Li being at least equal to the axial length Ls of the secondary lug, this widened portion of width D1 being joined to the main lug by an end face inclined at an angle B1 at least equal to 18 degrees and at most equal to 25 degrees, this angle B1 being measured with respect to the circumferential direction, and wherein each said secondary lug comprises an end face inclined at an angle S1 with the same orientation as the angle B1 with respect to the circumferential direction, this angle S1 being at least equal to 18 degrees and at most equal to 25 degrees.

2. The tire according to claim 1, wherein the angle S1 of the end face of each said secondary lug is at least equal to the angle B1 of the inclined end face of the widened portion of width D1.

3. The tire according to claim 1, wherein the leading lateral face of each main lug comprises, between the end close to the equatorial mid-plane and an axial width Lm less than the axial width of the secondary lugs, a widened lug portion of width D2 at least equal to 10% and at most 25% of the mean width Ep, this widened portion of width D2 being joined to the main lug by an end face inclined at an angle B2 of between 18 degrees and 25 degrees, this angle B2 being measured with respect to the circumferential direction and having the same orientation as the angle B1 of the widened portion of width D1 formed on the trailing face of the same main lug.

4. The tire according to claim 1, wherein the surface void ratio of the central part of the tread, this central part being delimited axially by planes perpendicular to the axis of rotation and passing through the axial ends of the secondary lugs situated on either side of the equatorial mid-plane, is at least equal to 60% and at most equal to 70%, and wherein the surface void ratio of the edge parts of the tread that are situated axially on the outside of the central part is between 40% and 55%.

5. The tire according to claim 1, wherein the difference between the surface void ratio of the central part and the surface void ratio of each edge part is at least equal to 15%.

6. The tire according to claim 1, wherein the end parts of the main lugs are joined together by a bridging portion that passes all around the tire, this bridging portion having a maximum height of between 20% and 40% of the height of the main lug, this maximum height being measured with respect to the bearing surface of the tread and a maximum width at most equal to the half-width of the tread decreased by the width Ls.

7. The tire according to claim 6, wherein the bridging portion extends from the bearing surface of the tread and comprises, on each side with respect to the equatorial mid-plane, a lateral face oriented with the same orientation as the face joining the widened portion of width D2 to the main lug this lateral face being inclined at an angle close or equal to the angle B2 formed by the end face of the widened portion of width D2 formed on the main lug.

\* \* \* \* \*